(12) United States Patent
Russell et al.

(10) Patent No.: US 8,401,552 B2
(45) Date of Patent: Mar. 19, 2013

(54) TELECOMMUNICATIONS NETWORKS AND DEVICES

(75) Inventors: Nick Russell, Newbury (GB); Christopher David Pudney, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 420 days.

(21) Appl. No.: 12/657,789

(22) Filed: Jan. 27, 2010

(65) Prior Publication Data

US 2010/0215001 A1   Aug. 26, 2010

(30) Foreign Application Priority Data

Jan. 27, 2009  (GB) .................................. 0901314.5

(51) Int. Cl.
*H04W 4/00* (2009.01)
*H04W 36/00* (2009.01)
*H04M 1/66* (2006.01)
*H04L 29/06* (2006.01)

(52) U.S. Cl. ..................... 455/435.1; 455/444; 455/411; 370/329; 726/4

(58) Field of Classification Search ............... 455/435.1, 455/444, 411; 370/329; 726/4
See application file for complete search history.

(56) References Cited

U.S. PATENT DOCUMENTS

| 2006/0128383 | A1 | 6/2006 | Arcens | |
| 2007/0298794 | A1* | 12/2007 | Cho | 455/435.1 |
| 2008/0039104 | A1* | 2/2008 | Gu et al. | 455/445 |
| 2008/0318551 | A1 | 12/2008 | Palamara et al. | |
| 2009/0103455 | A1* | 4/2009 | Balasubramanian et al. | 370/254 |
| 2010/0074223 | A1* | 3/2010 | Mahdi | 370/331 |

OTHER PUBLICATIONS

3GPP TS 23.236 V8.0.0 (Dec. 2008), $3^{rd}$ Generation Partnership Project; Technical Specification Group Services and System Aspects; Intra-domain connection of Radio Access Network (RAN) nodes to multiple Core Network (CN) nodes (Release 8), 38 pp.
3GPP TS 24.008 V.8.4.0 (Dec. 2008), $3^{rd}$ Generation Partnership Project; Technical Specification Group Core Network and Terminals; Mobile radio interface Layer 3 specification; Core network protocols; Stage 3 (Release 8), pp. 1-50.

* cited by examiner

*Primary Examiner* — Ariel Balaoing
(74) *Attorney, Agent, or Firm* — Muirhead and Saturnelli, LLC

(57) ABSTRACT

A GSM, UMTS or LTE mobile telecommunications network is disclosed. In addition to the conventional radio access network comprising the base stations, one or more additional access points may be provided. An access point is typically connected to the network core by an IP transport broadband connection. The access point is configured to appear to the mobile terminal as a conventional base station. Arrangements are disclosed which allow the network to more simply route mobile terminating calls to a mobile terminal in a network including home base stations. Other arrangements are disclosed which allow the network to verify the validity of a mobile terminal accessing the telecommunications network using a home base station, and correspondingly the validity of the home base station to register itself as serving a given UE.

11 Claims, 8 Drawing Sheets

TELECOMMUNICATIONS NETWORKS AND DEVICES

TECHNICAL FIELD

This application relates to a telecommunications network and more particularly to a method of controlling a micro base station, such as an IMS home base station, in the network. This application also relates to a micro base station for use in a mobile telecommunications network and a network element for controlling a micro base station.

BACKGROUND

There have recently been proposals to allow access to the features and services provided by cellular networks, such as GSM and UMTS networks, other than by accessing those networks in the conventional manner. In this regard, the conventional manner is by signalling between a mobile terminal and a conventional base station (macro base station) that has a connection to Base Station Controller (BSC) which in turn has a connection to a Mobile Switching Centre (MSC). The BSC is a component of the network which controls radio resource management, in order to ensure that a user is connected to the best base station in terms of signal strength or quality.

It has been proposed to increase network capacity by providing additional special base stations, for example at a subscriber's home or office. Many different names have been given to these special base stations such as home base stations, access points (APs), home access points (HAPs), IMS home base stations, home Node Bs (HNBs), pico-base stations, pico-cells and femto-cells, but all names refer to the same apparatus. For ease of reference, these base stations will be referred to here as home base stations or Home Node Bs (HNBs). Home base stations provide short range, localized cellular telecommunications coverage, and are typically purchased by, or rented to, a subscriber to be installed in their house or business premises. In this regard it is to be appreciated that the term "home" is not intended to be limited solely to use in residential premises.

It has also been proposed to use home base stations in the Long Term Evolution (LTE) telecommunications network currently being developed, but not yet implemented. LTE is likely to be the next network implementation after 3G (and 3G's incremental improvements, often referred to as 3.5G).

These home base stations may be dedicated network access points, or may be enhanced wireless internet hubs (i.e. providing wireless internet access, as well as wireless telecommunications network access). The range of home base stations is significantly smaller than macro base stations, typically providing coverage to a range much less than 100 meters.

An advantage of introducing home base stations in existing telecommunications networks is that, where sufficient numbers of them are implemented, the power level of the macro coverage could be reduced, due to a lower demand for the macro-base stations. Power reductions of course result in energy and financial savings, for instance due to less spectrum being required and also less hardware.

A further advantage of using a home base stations connected to the core network via an IP network is that existing broadband Digital Subscriber Line (DSL) connections can be used to link mobile terminals with the network core without using the capacity of the radio access network or transmission network of a mobile telecommunications network. In other words, the home base station can be integrated into a DSL modem/router so as to use DSL connections to backhaul the traffic to the communication network.

A still further advantage is that home base stations are able to provide "mobile" network access to areas where there is no macro radio access network coverage. For example, a home base station could provide 3G coverage in an area where there is no macro 3G coverage at all, perhaps only macro GSM coverage. The use of home base stations as an additional or alternative means for accessing the network therefore advantageously increases the network capacity and coverage.

Further additional challenges arise in implementing these home base stations as conventional base stations, in view of their ability to be installed and provisioned by the end consumer. Issues regarding the security of the home base station need to be addressed, particularly in view of possible modifications by an owner. For instance, one problem is that the owner of a home base station may seek to modify it in order to receive calls not intended for them, but, for instance, intended for another person or other entity that the owner wishes to eavesdrop or spy on, such as a famous person. A further problem is that the owner may wish to avoid call charges and seek to modify their home base station so that calls put through it are charged to another person's account.

A further problem relates to the fact that IMS Home Node Bs utilise SIP signalling. IMS (IP Multimedia Subsystem) is an architectural framework for delivering Internet Protocol (IP) multimedia services in mobile networks. However, at present it is not possible to move calls from legacy mobile terminals making MSC domain calls into the IMS domain via IMS Home Node Bs as the signalling used by such legacy mobile terminals is not compatible with SIP signalling.

Additionally, the current procedures used at the radio interface for communicating with mobile terminals are in accordance with 3GPP TS 24.008, which at present is not wholly compatible with SIP signalling. There is therefore a need to improve the interworking between mobile terminals and IMS Home Node Bs in order to allow users of such terminals to be able to fully utilise the IMS Home Node Bs.

In particular, a problem with this compatibility lies in the fact that the IMS Home Node B needs to register each mobile terminal it is serving with the IMS system, which is a SIP server. Currently the IMS registration from the IMS HNB is performed at the same time as a UMTS location area (LA)/Routing Area (RA) update (or a GSM LA/RA update in a Dual Transfer Mode (DTM) capable GSM system). In this regard, as part of the R'99 paging coordination functionality used in such LA/RA updates, the applicable MSC/SGSN sends the mobile terminal's IMSI to the HNB, and the I-INB then uses this IMSI to register the terminal at the HNB's IP address/name.

However, it is to be appreciated that HNBs contain some RNC functionality, and so, when UEs attach via a HNB, the HNB stores the UE's IMSI/TMSI along with the wireless ciphering and integrity protection keys. These keys will remain valid as long as the UE stays in its current Location Area (LA)/Routing Area (RA). Therefore, from the HNB's viewpoint, these keys can then be used for subsequent communications with the UE without contacting the MSC/SGSN, until a point in time when the UE subsequently performs a LA update (LAU)/RA update (RAU). However, the proper functioning of this procedure also requires the HNB to be in a LA/RA different to that of its surrounding/overlaying cells (being either other "home cells" or cells from the traditional PLMN). This is because where a UE moves between base stations within a LA/RA, there are certain situations where the keys and/or the UE's Temporary Mobile Subscriber Identity (TMSI) change, but, since there will be no LAU/RAU, the HNB will not be notified of the changes. Therefore, if the UE subsequently returns to the HNB, having stayed with the LA/RA but changing its TMSI and/or security keys since it was last attached to the HNB, the HNB will not be aware of the new cipher keys. Therefore the HNB is likely to attempt communication with the UE using its saved, but not current, cipher keys. Its only once this has occurred, and signalling resources wasted, that it may become evident to the HNB that a LAU/RAU is required.

Therefore, ideally each HNB is allocated its own LA/RA for this technique to function correctly, so that the UE always performs a LAU/RAU when it moves away from the HNB. However, in order to limit the signalling load on the core network, it is desirable for a Home Node B to be in the same LA and/or RA as its surrounding cells, and so this is not really feasible. Therefore there is a need to ensure the HNB has the most up-to-date information, but without unduly increasing the signalling load.

A still further problem in relation to the compatibility between SIP signalling and 3GPP TS 24.008 is that whilst entry into an IMS HNB causes IMS registration, idle mode movement away from the HNB does not lead to deregistration in most situations. This is problematic, particularly in terms of the increased signalling load that is likely to occur when attempting to route calls/communications towards a mobile terminal that has in fact moved away.

There is therefore a need to overcome and/or alleviate at least one of the problems of the prior art.

SUMMARY OF THE INVENTION

According to a first aspect, the system described herein provides, in a telecommunications network including a radio access network comprising a plurality of base stations, each defining a cell, for wirelessly transmitting data that is receivable by one or more mobile terminals, wherein at least one of the base stations is an IMS-enabled Home Node B (HNB) in communication with a core component of the telecommunication network via an IP server, a method of validating a request to register a mobile terminal with the HNB, the method including: obtaining an identifier of the last known cell location in which the mobile terminal was registered, together with an age associated with that registration; comparing the last known cell location identifier and the associated age with the HNB identity; and using the comparison to decide whether or not to accept the mobile terminal registration request.

This method may be performed by various components of the telecommunications network, including the HNB itself, the IP server, a separate authentication server, or any combination thereof.

Advantageously this aspect of the system described herein enables the validity of a mobile terminal registration request to be verified, using existing network information. This ensures that both the HNB is not falsely registering a mobile terminal in order to surreptitiously incorrectly divert communications intended for the mobile terminal, and also that the HNB is not able to falsely allocate call charges to the mobile terminal's account.

According to a second aspect, the system described herein provides in a telecommunications network including a radio access network comprising a plurality of base stations, each defining a cell, for wirelessly transmitting data that is receivable by one or more mobile terminals, wherein at least one of the base stations is a Home Node B (HNB) in communication with a core component of the telecommunication network via an IP server, a method of routing calls in the network, the method including: receiving an incoming call for a mobile terminal at a network server that has the option of sending the communication via a CS route or via an IMS route; checking an IMS server database to determine if the mobile terminal is registered at a HNB, and where registered, obtaining the HNB identity and an age associated with the registration; interrogating the core network component to obtain data defining the last known location of the mobile terminal and an age associated with the last known location; and comparing the data obtained from the IMS server database with the data obtained from the core network component to decide whether to route the call via the CS route or via the IMS route.

This aspect of the system described herein again makes use of existing information in the network in order to select the most appropriate route in the network. In this regard, this aspect recognises that many HNBs are not notified of the movement of UEs away from them as serving base stations, and accordingly serves to save signalling resources. Preferably the method also entails a notification to the HNB to deregister the UE where the CS route is selected.

According to a third aspect, the system described herein provides in a telecommunications network including a radio access network comprising a plurality of base stations, each defining a cell, for wirelessly transmitting data that is receivable by one or more mobile terminals, wherein at least one of the base stations is an IMS-enabled Home Node B (HNB) in communication with the telecommunication network via an IMS server, and a routing server, associated with the IMS server, being configured to route all calls on a CS route, a method of routing calls in the network including: receiving a paging message for a mobile terminal at the HNB, the paging message being transmitted on a CS route by the routing server; and upon the mobile terminal being successfully paged, the HNB initiating an IMS session with the IMS server including data to notify the routing server so that the call is routed to the mobile terminal via the IMS session.

According to a fourth aspect, the system described herein provides, in a telecommunications network including a radio access network comprising a plurality of base stations, each defining a cell, for wirelessly transmitting data that is receivable by one or more mobile terminals, wherein at least one of the base stations is an IMS-enabled Home Node B (HNB) in communication with an MSC of the telecommunication network, a method of routing calls in the network, the method including: the MSC receiving a notification upon the HNB being successfully registered with a mobile terminal; the MSC maintaining the notification until receipt of: a) a LAU for the mobile terminal; b) an indication of an IMS registration of the mobile terminal on another HNB; c) a cancel location communication from the network; and then sending a cancel IMS registration message to the HNB.

The notification may be received from the HNB or an IMS server.

This aspect of the system described herein addresses the existing problem of HNBs not being sufficiently integrated into the mobile telecommunications network, and accordingly not necessarily being notified of a mobile terminal moving away from its location. By introducing a notification to the MSC, with very little functional changes to the existing operation of the MSC, it becomes possible for the MSC to monitor which UEs are registered with which HNBs and to notify the HNBs when UEs move away and/or become detached from the network.

According to a fifth aspect, the system described herein provides in a GSM telecommunications network including a radio access network comprising a plurality of base stations, each defining a cell, for wirelessly transmitting data that is receivable by one or more mobile terminals, wherein at least one of the base stations is a home base station in communication with a core component of the telecommunication network via an IP server, a method of validating a mobile terminal request to register with the home base station, the method including: transmitting a request to the mobile terminal for an identity indication, the request transmitted a plurality of times, dependent on the number of bits utilised by the MSC to detect duplicated messages in the network layer.

The identity indication requested may be the mobile terminal's IMSI.

This aspect of the system described herein facilitates the integration of home base stations into GSM networks by enabling the home base stations to gather information required, without conflicting with existing GSM signalling.

In a sixth aspect, the system described herein provides in a telecommunications network including a radio access network comprising a plurality of base stations, each defining a cell, for wirelessly transmitting data that is receivable by one or more mobile terminals, wherein at least one of the base stations is a home base station, with mobile terminal registration data for communicating with a given mobile terminal as its serving base station, a method of the home base station recognising changes in the registration data, the method including: receiving a communication from the mobile terminal; comparing a key sequence identifier included in the communication with a key sequence identifier saved in relation to the registration data; where the key sequence identifiers differ, transmitting a location area update request to the network in relation to the mobile terminal.

In this way, this aspect of the system described herein enables a home base station to recognise instances when a mobile terminal changed its TMSI and/or security keys since it was last attached to the home base station. This is a procedure that makes use of existing signalling, but signalling not to date utilised by base stations, instead being intended for core network components such as the MSC. Advantageously, this aspect of the system described herein results in a reduction of the usage in signalling resources.

It is to be appreciated that all these aspects of the system described herein may be implemented as methods and/or within apparatus utilised in telecommunications networks. The different aspects of the system described herein may also be implemented individually or in any combination.

BRIEF DESCRIPTION OF THE FIGURES

For a better understanding of the system described herein, embodiments will now be described by way of example, with reference to the accompanying drawings, in which.

DETAILED DESCRIPTION

Figure 1:
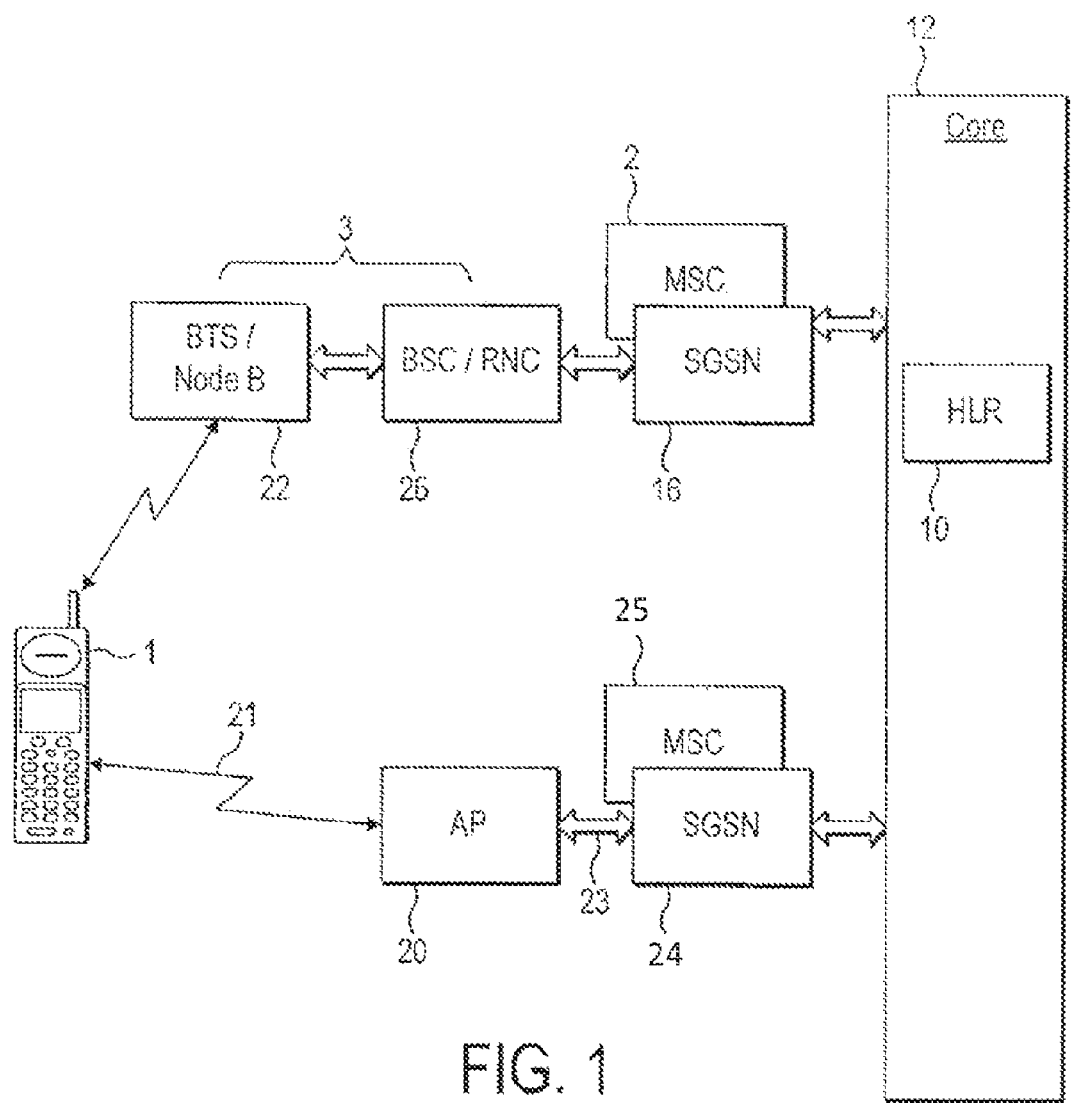
FIG. 1 is a diagrammatic drawing of key elements of a mobile telecommunications network for receiving IP based communications from a home base station in addition to communications from a conventional base station.

Key elements of a mobile telecommunications network, and its operation, will now briefly be described with reference to FIG. 1.

Conventionally, in a GSM/UMTS network, a number of base stations are arranged in groups and each group of base stations is controlled by one BSC/RNC which in turn is controlled by a mobile switching centre (MSC), such as MSC 2 for Base Station Subsystem 3. In practice, the network will incorporate many more MSCs and base stations than shown in FIG. 1.

Each BTS 22 corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal (UE) is shown at 1. The mobile terminal may be a handheld mobile telephone, a personal digital assistance (PDA) or a laptop computer equipped with a datacard.

In a GSM mobile telecommunications network, each base station 3 comprises a base transceiver station (BTS) (22) and a base station controller (BSC) (26). A BSC may control more than one BTS. The BTSs and BSCs comprise the radio access network.

In a UMTS mobile telecommunications network, each base station comprises a node B (22) and a radio network controller (RNC) (26). An RNC may control more than one node B. The node Bs and RNCs comprise the radio access network.

In the proposed LTE mobile telecommunications network, each base station comprises an eNode B. The base stations are connected to one or more Mobility Management Entities (MMEs) and a Serving Gateways (SGW).

Each subscriber to the network is provided with a smart card or SIM/USIM which, when associated with the user's mobile terminal identifies the subscriber to the network. The SIM/USIM card is pre-programmed with a unique identification number, the "International Mobile Subscriber Identity" (IMSI). The subscriber is issued with a publicly known number, that is, the subscriber's telephone number, by means of which calls to the subscriber are initiated by callers. This number is the MSISDN.

The network includes a home location register (HLR) 10 which, for each subscriber to the network, stores the IMSI and the corresponding MSISDN together with other subscriber data, such as the current or last known MSC or SGSN of the subscriber's mobile terminal. In use, to improve privacy, a Temporary IMSI (TMSI) is usually used to replace the IMSI on a per geographical location basis.

When the subscriber wishes to activate their mobile terminal in a network (so that it may make or receive calls subsequently), the mobile terminal 1 transmits the IMSI (read from an associated SIM/USIM card) to the Base Station Subsystem 3 associated with the particular cell in which the terminal 1 is located. In a traditional network, the BSS 3 then transmits this IMSI towards the MSC 2 with which the BSS 3 is connected. In a network using the functionality described in 3GPP TS 23.236, the BSS follows prescribed rules to select which MSC to use, and then transmits this IMSI to the selected MSC.

MSC 2 now accesses the appropriate storage location in the HLR 10 present in the network core 12 and extracts the corresponding subscriber MSISDN and other subscriber data from the appropriate storage location, and stores it temporarily in a storage location in a visitor location register (VLR). In this way, therefore the particular subscriber is effectively registered with a particular MSC (MSC 2), and the subscriber's information is temporarily stored in the VLR associated with that MSC.

When the subscriber using mobile terminal 1 wishes to make a call, having already inserted the SIM/USIM card into the reader associated with this mobile terminal and the SIM/USIM has been authenticated in the manner described, a call may be made by entering the telephone number of the called party in the usual way. This information is received by the BSS 3 and passed on to MSC 2. MSC 2 routes the call towards the called party. By means of the information held in the VLR, MSC 2 can associate the call with a particular subscriber and thus record information for charging purposes.

MSCs 2 and 25 support communications in the circuit switched domain—typically voice calls. Corresponding SGSNs 16 and 24 are provided to support communications in the packet switched domain—such as GPRS data transmissions. The SGSNs function in an analogous way to the MSCs.

From the description above, it will be understood that the coverage area of a mobile telecommunications network is divided into a plurality of cells, each of which is served by a respective base station.

When a calling party (whether a subscriber within the mobile telecommunications network or outside it) attempts to call a mobile terminal within the network, that mobile terminal must be paged. Paging is a process of broadcasting a message which alerts a specific mobile terminal to take some action—in this example, to notify the terminal that there is an incoming call to be received. If the network knows in which cell the mobile terminal is located, it is only necessary to page in that cell. However, if the mobile terminal is moving within the network, the precise cell in which the mobile terminal is located may not be known. It will therefore be necessary to perform paging in a number of cells. The greater the number of cells in which paging must occur, the more use of valuable signalling capacity within the network.

In this regard, it is to be appreciated that each cell has a unique cell global identity (CGI), whereby the CGI is a concatenation of the Location Area ID and a Cell ID and uniquely identifies a given cell.

In a UMTS/GSM network, the problems of excessive use of signalling capacity by paging a multiplicity of cells or performing a multiplicity of frequent location updates is solved in a known manner by dividing the coverage area of the mobile telecommunications network into a plurality of location areas (LAs) and into a plurality of routing areas (RAs). The equivalent areas in the proposed LTE network are described as tracking areas (TAs).

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area. The mobile terminal uses this data to determine when it has moved into a new location area. The terminal stores its last known location area on its SIM/USIM. This information stored on the SIM/USIM is regularly compared with the location area information broadcast by its local cell. The identities of the two location areas are compared. If they are different, the mobile terminal determines that it has entered a new location area. The mobile terminal then gains access to a radio channel and requests a location update. If the MSC/VLR is the same for the new and old location areas, the network can immediately authenticate the mobile terminal and note the change of location area. However, if the mobile terminal is moved to a different MSC/VLR, the MSC/VLR addresses a message to the HLR. The HLR notes the new location and downloads security parameters to allow the network to authenticate the mobile. It also passes on subscription details of the user to the new VLR and informs the old VLR to delete its records.

A routing area relates to a particular geographical area for communications in the packet-switched domain. The procedure performed for routing areas is analogous to that just described for location areas.

In addition to FIG. 1 showing the elements for providing access to a GSM or UMTS network by a conventional base station 3, a Home Node B (AP 20) is shown. The Home Node B 20 provides a radio link 21 to mobile terminal (UE) 1.

The radio link 21 from the Home Node B 20 to the mobile terminal 1 uses the same cellular telecommunication transport protocols as the conventional BTS 22 but with a smaller range—for example 25 m. The Home Node B 20 appears to the mobile terminal 1 as a conventional base station, and no modification to the mobile terminal 1 is required to operate with the Home Node B 20. The Home Node B 20 performs a role corresponding to that of a GSM BTS 22 and BSC 26 and/or UMTS Node B and RNC and/or an LTE eNode B.

Communications between the Home Node B 20 and the MSC 25/SGSN 24 are IP based communications, and may be, for example, transmitted over a broadband IP network (and routed via the Internet). The Home Node B 20 converts the cellular telecommunications transport protocols used between the mobile terminal 1 and the Home Node B 20 to IP based signalling.

The Home Node B (HNB) is connected to the core network via an IMS server (not shown). In other words, it is to be appreciated that IMS, or Internet Protocol (IP) Multimedia Subsystem, is a technology which merges the Internet with cellular telecommunications. IMS is a standardized architecture for operators intending to provide mobile and fixed multimedia services. IMS uses a Voice over IP (VoIP) implementation based on a 3GPP standardized implementation of Session Initiation Protocol (SIP) and runs over the standard Internet Protocol (IP). Both packet-switched (PS) and circuit switched (CS) communication systems are supported.

With this background in mind, an implementation of the first embodiment of the invention will now be described, which seeks to ensure that a Home Node B is legitimately registered to communicate with a given UE.

Figure 2:
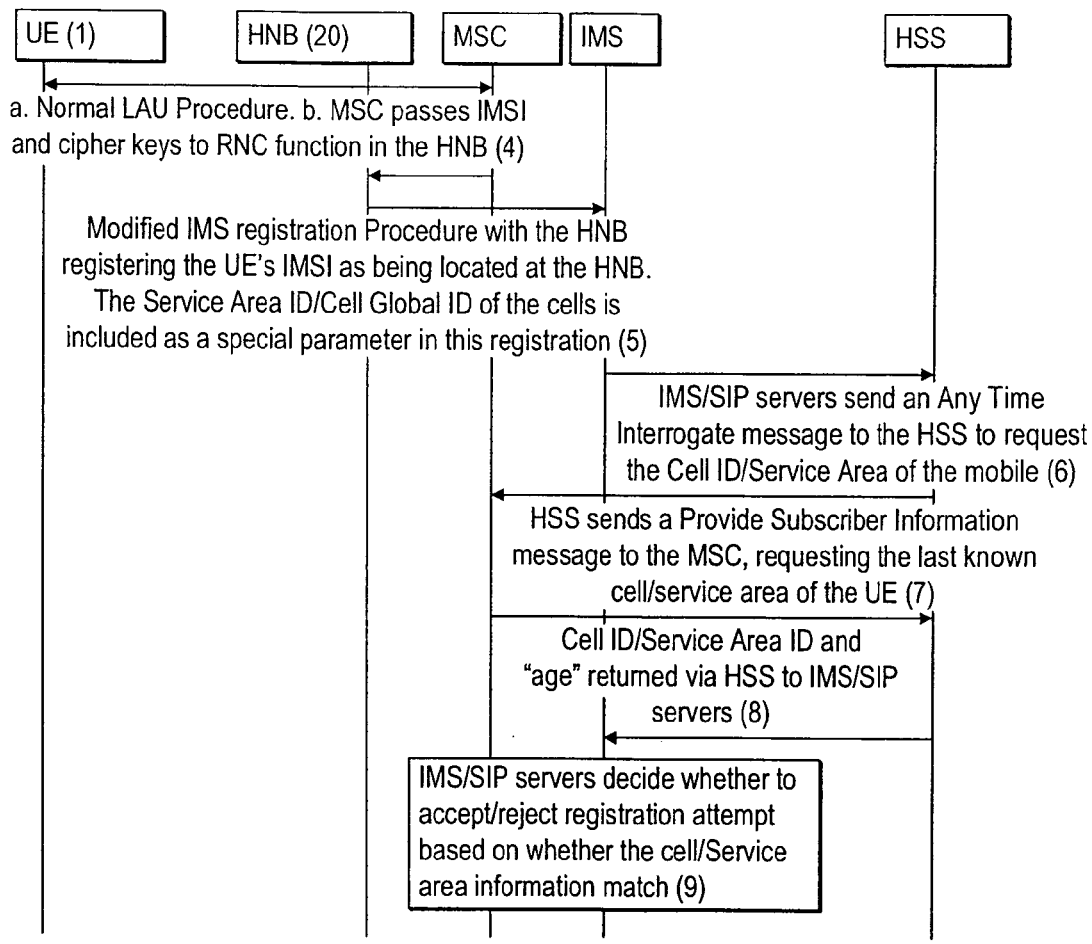
FIG. 2 illustrates an exemplary signalling diagram in relation to verifying the validity of a mobile terminal/home node B combination in accordance with an embodiment of the invention.

With reference to FIG. 2, it is to be appreciated that an operational mobile terminal (1) will perform LAUs as necessary. This involves the UE (1) opening up a Radio Resource Control (RRC) connection, and passing its IMSI or TMSI to the MSC controlling the LA/RA in which it is located (4). The MSC will convert the TMSI to the IMSI (where necessary) and then pass information (e.g. IMSI, cipher keys) to the base station that the UE is using. In this example, the base station is a HNB.

In response to this UE registration (4), the HNB registers that UE with the IMS. According to this embodiment of the invention, this involves the HNB sending the registered UE's IMSI along with its own identity (ID) information, such as the service area ID and/or CGI of the cell (5). This additional identity information may be provided as a special parameter in this IMS registration procedure.

With this information provided to the IMS server, according to this embodiment of the invention, the IMS server is able to validate the legitimacy of the HNB and its association with the "registered" UE. In this regard, to validate the association, the IMS sends an "Any Time Interrogation" message to the core network (i.e. the Home Subscriber Server (HSS)/Home Location Register (HLR)) to request the Cell ID/Service Area of the UE (6). Upon receipt of this request, the HSS/HLR sends a Provide Subscriber Information message to the MSC, requesting the last known cell/service area of the UE (7). The MSC provides this information, typically in conjunction with a time indication denoting the age/currency of the information (8). The HSS/HLR then forwards this information to the IMS server.

The IMS server then has information from both the HNB and the core network in relation to the UE and it uses this information to decide whether to accept or reject the registration (9). For instance, where the cell ID received from the HNB matches that received from the HSS/HLR, then this is a good indication that the request from the HNB is valid. If however, there is no match, the IMS server may decide that the possibility exists that the HNB is trying to falsely obtain communications intended for the particular UE, and not accept the registration request from the HNB (as well as any other actions considered appropriate). Alternatively, if there is no match, the IMS server may also check the "age" of the last known cell information, and where the age information indicates that the last known location of the UE was not in the recent past, then the IMS server may decide to reject the registration request, as the LAU procedure (the one that caused the IMS HNB to register the UE to IMS) should have caused the MSC to update its "last known location" information.

It is to be appreciated that as n alternative, rather than the HSS/HLR requesting the last known location from the MSC, it may request this information from the SGSN and/or MME.

In this way, a mechanism is provided which offers a reasonable degree of assurance that the IMSI being registered is that of a mobile terminal that is actually in that home cell. In effect, the IMS/SIP server performs a security check by matching the cell ID of the HNB against information in the MSC/SGSN. This embodiment therefore provides a network-based security binding solution in relation to a HNB in the telecommunications network.

An alternative embodiment of the invention relates to the use of a network-initiated verification to the UE. This embodiment makes use of the fact that many UEs (e.g. Blackberry™ and iPhone™ terminals) currently, as a matter of course, set up a Packet Switched connection (i.e. a PS attach) when registered in a network in order to send and receive information, even when idle.

Therefore, in this embodiment of the invention, when the UE performs a LAU update, and establishes a circuit switched attachment to the MSC managing its LA/RA by sending its IMSI and cipher keys to the MSC, as per step (4) in the previous embodiment, it additionally sends a PS attach request in order to set up a PS tunnel to a Verification Server (30). In this embodiment, the base station through which the UE performs its LAU is a HNB. The PS tunnel that is established (31) can be based upon a GPRS/3G PS/EPS attach or a WLAN attach (i.e. different attach signalling depending upon the type of network being used by the UE). It is also to be appreciated that EPS is the Evolved Packet System (EPS) currently being developed by 3GPP.

The PS tunnel is established to a verification server, which could be a component of the IMS server, another server in the network (e.g. the S-CSCF, SCC AS (Service Centralisation and Continuity Application Server)) or a separate server. The UE knows the address/location of the verification server by means of a predefined server discovery mechanism (e.g. DNS lookup using a preconfigured IP address of the HNB or a fully qualified domain name (preconfigured or automatically generated)). The Tunnel could be established using the OMA SUPL standard (to a SUPL server). Alternatively it could use RADIUS or Diameter protocols.

After seeing the CS attach successfully completed, the HNB commences a registration procedure with the IMS server (32). Upon receiving the IMS server receiving the IMS registration request from the HNB, which includes identification information for the UE, the IMS server, before accepting the IMS registration, sends a message to the verification server to see if the UE really is on the IMS HNB attempting to register the UE. This UE verification request (33) includes the HNB identity.

Upon receiving this verification request, the verification server sends a message to the UE over the established PS tunnel requesting the identity of the base station upon which it is camped (e.g. the Cell ID) (34). If the PS tunnel is not available, then the IMS registration is typically denied. If the PS tunnel is available, and the UE receives the cell identity request (34), the UE sends a message back to the verification server over the PS tunnel containing its current cell ID (35). It is to be appreciated that from the UE's perspective, these instructions could be received and processed by an application on the (U)SIM card, ISIM or by the UE itself. Where the application is located on the (U)SIM, this could be provisioned using the (U)SIM Toolkit provisioned on the (U)SIM for facilitating value added services.

Upon receiving this response from the UE, the verification server compares the cell identity information received from the UE with that previously received from the HNB in its UE verification request. If they match, then a positive verification response is sent to the HNB (36). The matching performed by the verification server may be facilitated using a Cell ID and IMS HNB mapping table, stored either locally or accessed remotely.

If the verification server acknowledges that the UE is on the identified IMS HNB, then IMS registration is allowed to proceed. Otherwise the IMS registration is denied (37). The verification server, upon completing the communication exchange with the UE, may tear down the PS tunnel. This tearing down of the PS tunnel may also be performed independently of whether or not the verification was successful.

Figure 3:
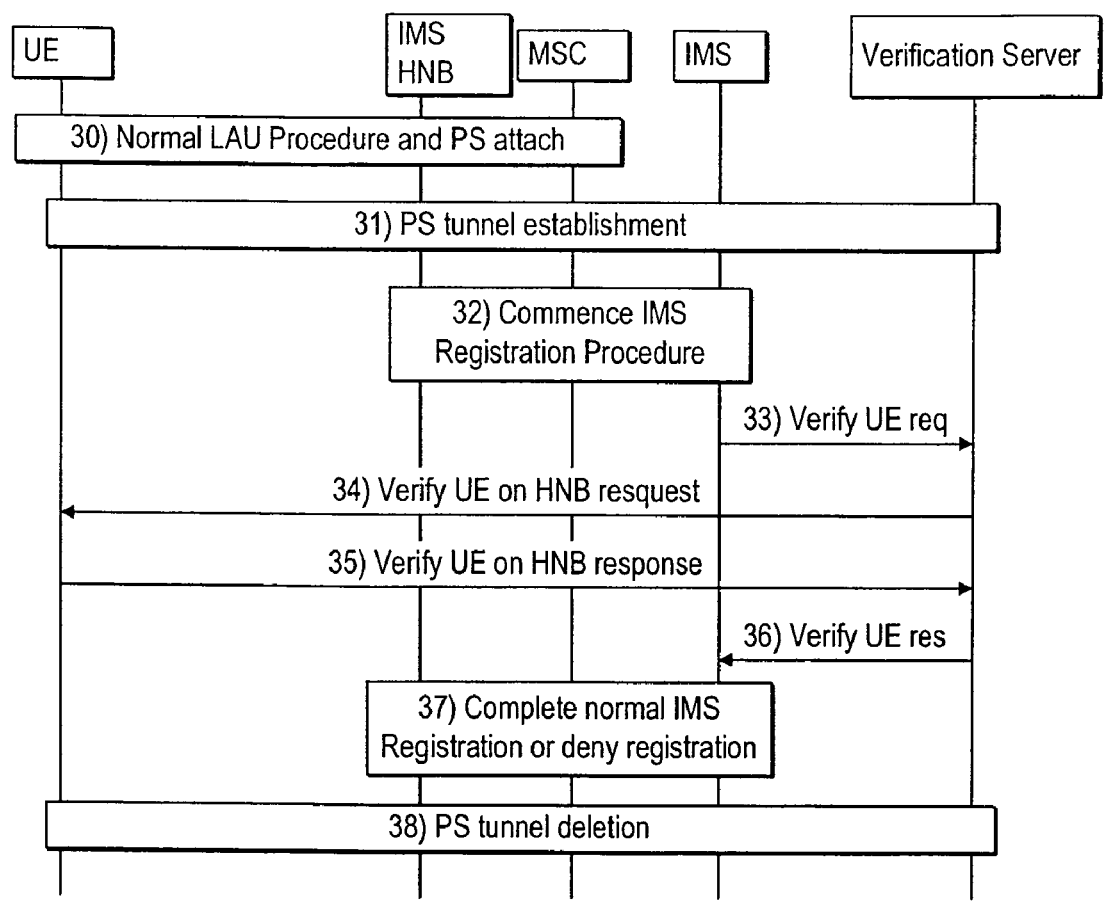
FIG. 3 shows an exemplary signalling diagram in relation to verifying the validity of a mobile terminal/home node B combination in accordance with a further embodiment of this invention.
Figure 4:
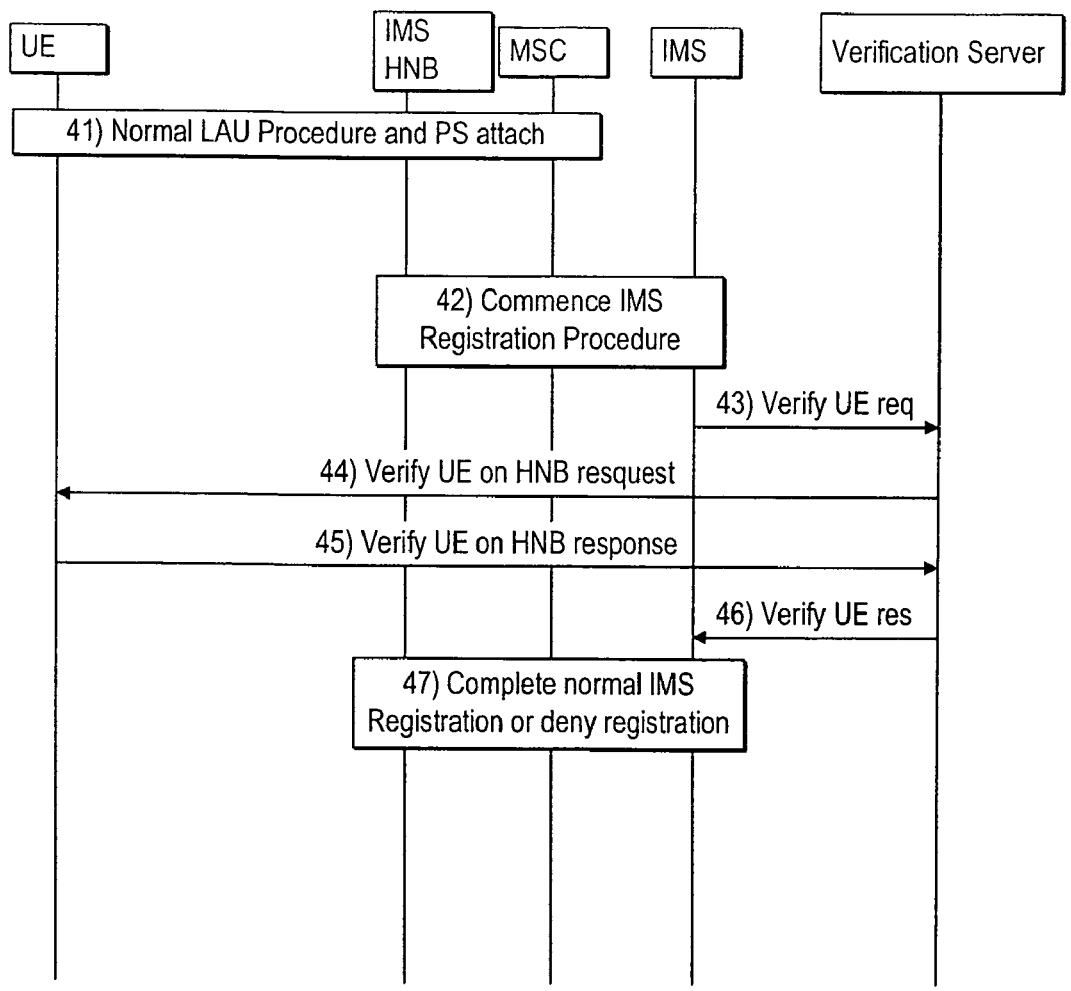
FIG. 4 shows an exemplary signalling diagram in relation to verifying the validity of a mobile terminal/home node B combination in accordance with a still further embodiment of this invention.

FIG. 4 illustrates a still further embodiment of this invention. As per the previous FIG. 3 embodiment, the UE performs a CS attach to the MSC through the IMS HNB as normal. The UE may additionally perform a PS attach, such as through either GPRS/3G PS/EPS attach or WLAN attach (41).

Upon seeing the successful CS attach, the IMS HNB commences IMS registration as normal (42). As part of this registration procedure, a server in the IMS (such as the S-CSCF), sends a message to a verification server to see if the UE really is on the IMS HNB attempting to register the UE (43). This UE verification request includes the IMS HNB identity.

Upon receiving this verification request, the verification server sends a message to the UE requesting its serving cell ID using the CS connection (44). This CS connection message could be an SMS, a network initiated USSD (Unstructured Supplementary Service Data) or using User-to-User signalling. If the message cannot be sent (e.g. due to absent subscriber), the IMS registration is typically denied and no further steps processed. Alternatively, if the message is successful sent, the UE will send a reply back to the verification server over the same CS connection method as the received message (45). This message contains the UE's current serving cell ID.

The verification server then performs the verification between the serving cell ID and the applicable IMS HNB (e.g. using a table mapping the cell IDs with HNB identities) and sends an appropriate reply to the IMS HNB (46). If the verification server acknowledges that the UE is on the identified IMS HNB, then IMS registration is allowed to proceed. Otherwise the IMS registration is denied (47).

In a further alternative, a combination of the FIGS. 3 and 4 embodiment may be implemented, whereby upon the verification server receiving the verification request (33) from the HNB, the verification server has a choice of utilising a PS access tunnel, or it may use a CS connection (i.e. send the request to the UE via the MSC). This choice may be based upon the availability of the connections, the known capabilities of the UE (e.g. it may be located in a GSM network and unable to establish a PS access tunnel), the local operator policy and/or the requirements of the application on the (U)SIM within the UE.

These embodiments therefore enable the core network to provide enhanced mechanisms for independently verifying the combination of a HNB and a UE in order to ensure, inter alia, that the HNB is validly to receive communications intended for the UE, and that charges accrued through the HNB for a particular UE are genuinely attributable to that UE.

The embodiments described above in relation to FIGS. 2 to 4 have assumed that the HNB is in a 3G network. It is to be appreciated that the embodiments may equally be applied to a HNB in a GSM network, with some adaptations. For instance, if the UE is performing a LAU to the HNB in a GSM network, where the serving MSC supports Dual Transfer Mode (DTM: a GSM mechanism which enables simultaneous transfer of CS and PS data), then the MSC will send the IMSI to the BSS (in this case being the HNB).

However, if the MSC does not support DTM, the HNB can be configured to send an identity request to the mobile to obtain its IMSI. A problem with this is that the request has been found to destabilise the layer 3 message sequence numbers between the UE and the MSC. Layer 3 is the network layer that handles signalling relating to radio resource management, mobility management and call control. To resolve this problem, in this alternative embodiment of the invention, the HNB sends multiple identity requests to the UE, the number being dependent upon whether the MSC is using 1 or 2 bits for the layer 3 message number. More specifically, if the MSC is using 1 bit for the layer 3 message, the HNB will send 2 identity requests, and if the MSC is using 2 bits, the HNB sends 4 identity requests. In this way, the multiple requests cycle the layer 3 message number back to the value that the MSC deems "correct".

In a further aspect which addresses the problem of a UE changing its TMSI and/or security keys since it was last attached to a HNB, the HNB is configured to check the Key Sequence Identifier (KSI—as used in UMTS) or Cipher Key Sequence Number (CKSN—as used in GSM) upon receiving a communication from the UE.

The HNB is also configured to store, for each UE registered with it, the UE's IMSI together with the allocated TMSI, cipher/integrity keys in association with the KSI/CKSN. Then, upon receiving a communication from the UE, the HNB will check to see if the KSI/CKSN matches the corresponding number it has stored for the UE. If these match, the HNB is able to assume that nothing has changed and the UE is still registered with it. If there is not a match, the HNB will know that the UE has reregistered with another base station, and that it will need to perform a LAU/RAU in order to obtain new keys and/or TMSI from the core network.

This is a simple check, but one which to date has not currently been suggested. It is therefore a simple solution, but one which advantageously greatly reduces the signalling load on the network, particularly between the UE and the HNB, as the HNB is able to determine whether it has the right cipher keys etc before attempting to communicate with the UE.

Figure 5:
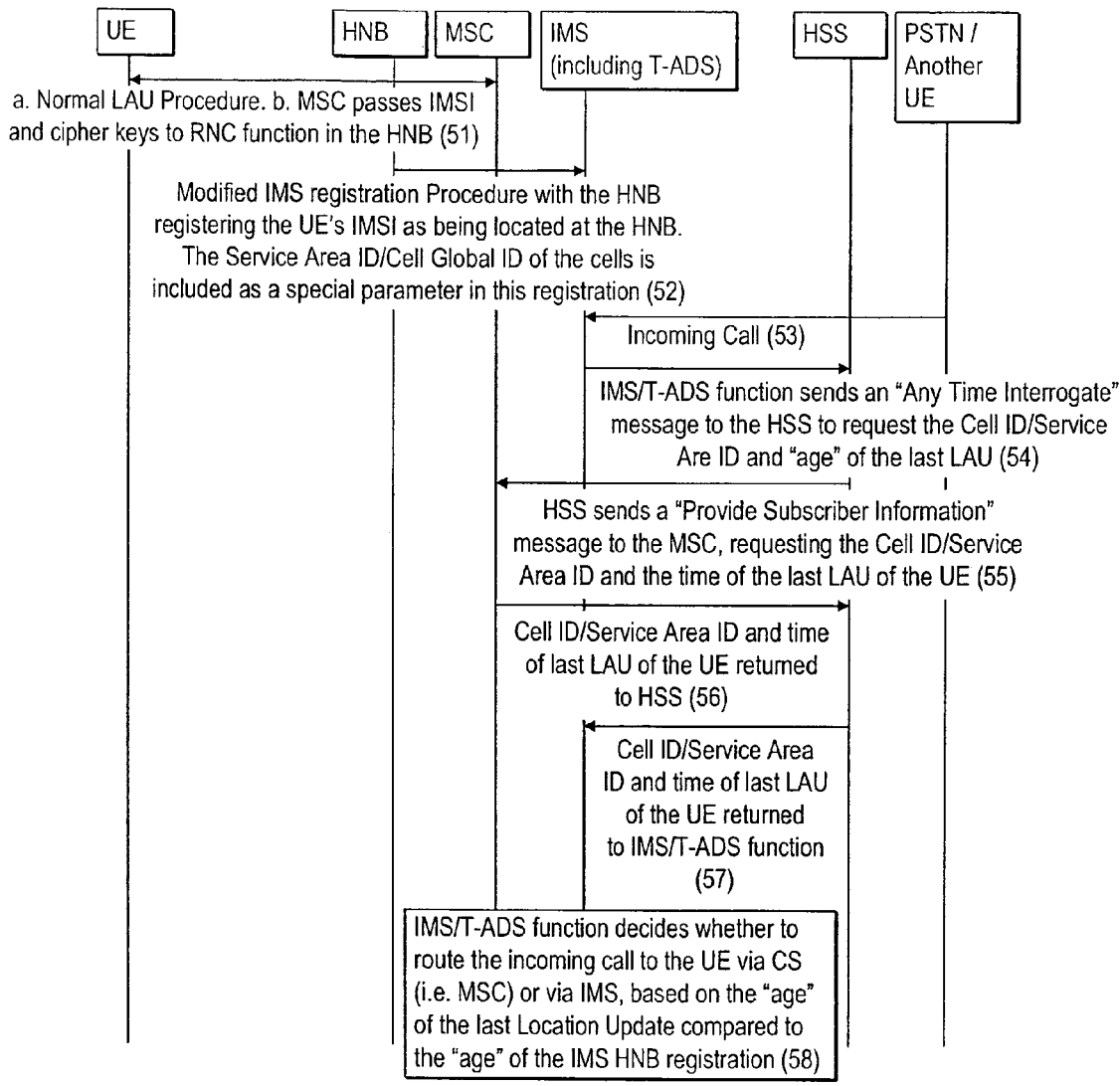
FIG. 5 illustrates an exemplary signalling diagram in relation to routing mobile terminating calls in accordance with an embodiment of the invention.

In a still further aspect, the IMS registration procedure is extended still further in order to address the problem of routing mobile terminating calls. To recap, when using different LAs for the IMS HNB and the wide area cellular system, the UE will perform a LAU procedure to an MSC when leaving the HNB whilst in idle mode. However, the HNB does not know about this outbound mobility and hence the HNB does not have the opportunity to perform an IMS deregistration for the UE. This means that incoming calls may get incorrectly routed to the HNB (i.e. after the UE has moved away from that HNB's coverage). With reference to FIG. 5, a solution is suggested which records and makes use of the "age" of a UE's cell registration data in deciding how to route an incoming call.

In FIG. 5, it is assumed that the UE has registered with the HNB using the normal LAU procedure, and that the HNB accordingly has received the IMSI and cipher keys from the MSC (51). It is also assumed that the HNB undergoes an IMS registration procedure which involves the HNB registering the UE's IMSI as being located at the HNB. In this registration procedure, as per the FIG. 2 embodiment of the invention, it is also preferable that the HNB forwards the service area ID/Cell ID as a special parameter in the registration.

With this situation established, the event of an incoming call for the UE is to be considered (53). In this regard, it is to be noted that for a user that has an IMS capability (either on the UE itself or on an IMS supporting HNB), all UE terminating calls go through a Terminating Access Domain selection (T-ADS) to select between CS and IMS. The T-ADS is typically a component of the IMS server, or may be separate but associated therewith.

Again with reference to FIG. 5, the incoming call is therefore directed to the IMS/T-ADS. Upon receiving the call, the IMS/T-ADS sends a request to the HSS/HLR for information concerning the last serving base station ID (cell ID/service area ID) for the UE as well as the "age" of that last location information. This request can ideally be sent as an "Any Time Interrogate" (ATI) message (54).

In response to this request from the IMS/T-ADS, the HSS/HLR sends a "provide subscriber Information" (PSI) message to the MSC, to access the requested information (55). The MSC then sends a reply containing the requested information (56). Note that if the UE has moved away from the IMS HNB, it will be camped on a cell in a different LA and hence will perform a Location Update to the MSC, and this causes the MSC to update the "last known cell ID and timestamp" for that UE. The requested information is in turn forwarded by the HSS/HLR to the IMS/T-ADS (57).

It is to be appreciated that the ATI/PSI messages are established messages in 3GPP as part of CAMEL (Customised Applications for Mobile network Enhanced Logic).

Once the T-ADS has received the last known activity of the UE from the MSC, it compares this information with the data it received via the IMS registration procedure (i.e. during step 52). That is, the T-ADS compares the received "age" with the "age" of the IMS registration made by the HNB. Based upon this comparison, the T-ADS makes a decision whether or not to route the incoming call to the UE via the IMS/HNB or whether to route the incoming call via CS (i.e. via the MSC) (58). Essentially the T-ADS will select the route with the least "age" and route the call accordingly.

Figure 6:
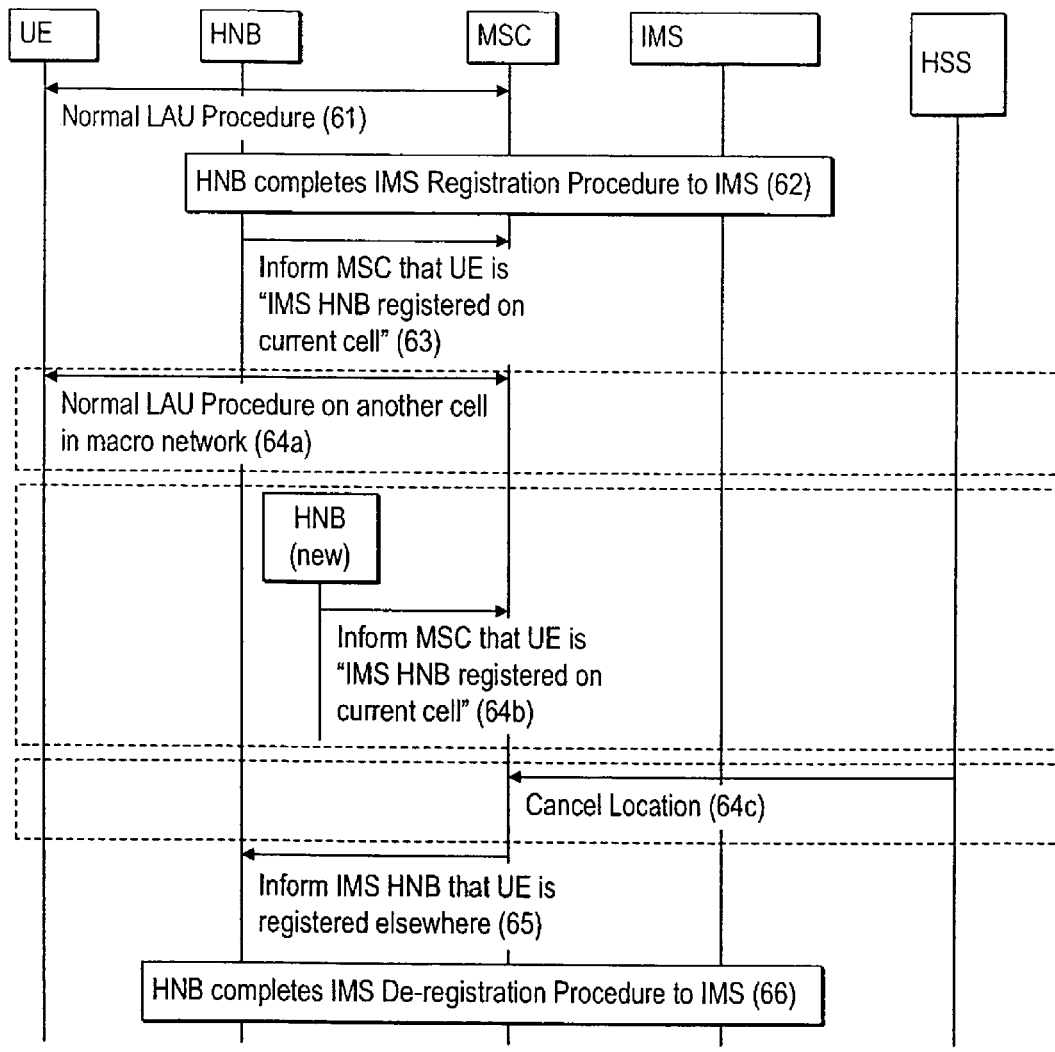
FIG. 6 illustrates an exemplary signalling diagram in relation to routing mobile terminating calls in accordance with an alternative embodiment of this invention.

An alternative embodiment of this invention is shown in relation to FIG. 6. This embodiment again assumes that the UE performs a normal LAU procedure with the serving MSC (61). The HNB also performs an IMS registration procedure with the IMS server (62). In this embodiment of the invention, when the IMS HNB registers the UE with the IMS server, it additionally sends a new message to the MSC informing the MSC that the UE is registered in its cell (63). The MSC stores this information as current until it receives either:

a LAU for the UE on a wide area cell (i.e. a macro base station) (64a);
 an indication of an IMS registration on another IMS HNB (64b); or
 a "cancel location" instruction from the HSS/HLR (e.g. upon the UE being switched off) (64c).

When the MSC receives one of these messages, it sends a "cancel IMS Registration" message to the old IMS HNB which causes that IMS HNB to perform an IMS deregistration for that UE (65). In this way, the HNB is integrated into the network, and informed of the movements/activity of the UE, as they become known. This therefore reduces signalling resources utilised during routing of mobile terminating calls.

Figure 7:
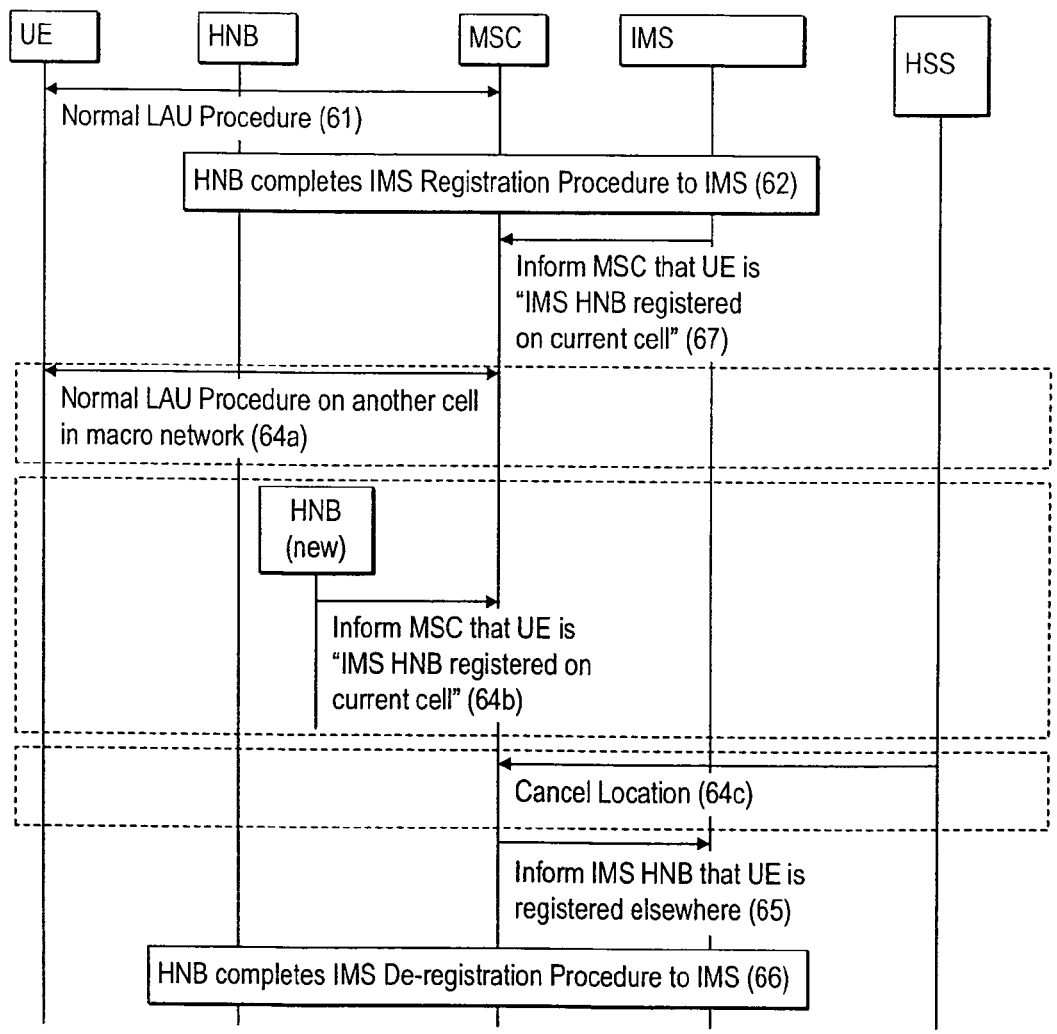
FIG. 7 illustrates an exemplary signalling diagram in relation to routing mobile terminating calls in accordance with a further alternative embodiment of this invention.

A further alternative embodiment is illustrated in FIG. 7. This embodiment is similar to that of FIG. 6, and so like numerals have been utilised where the steps undertaken are the same. The difference between these two embodiments is that, rather than the HNB informing the MSC that the UE is registered with it (step 63 in FIG. 6), the IMS server informs the MSC of such (new step 67 in FIG. 7).

Figure 8:
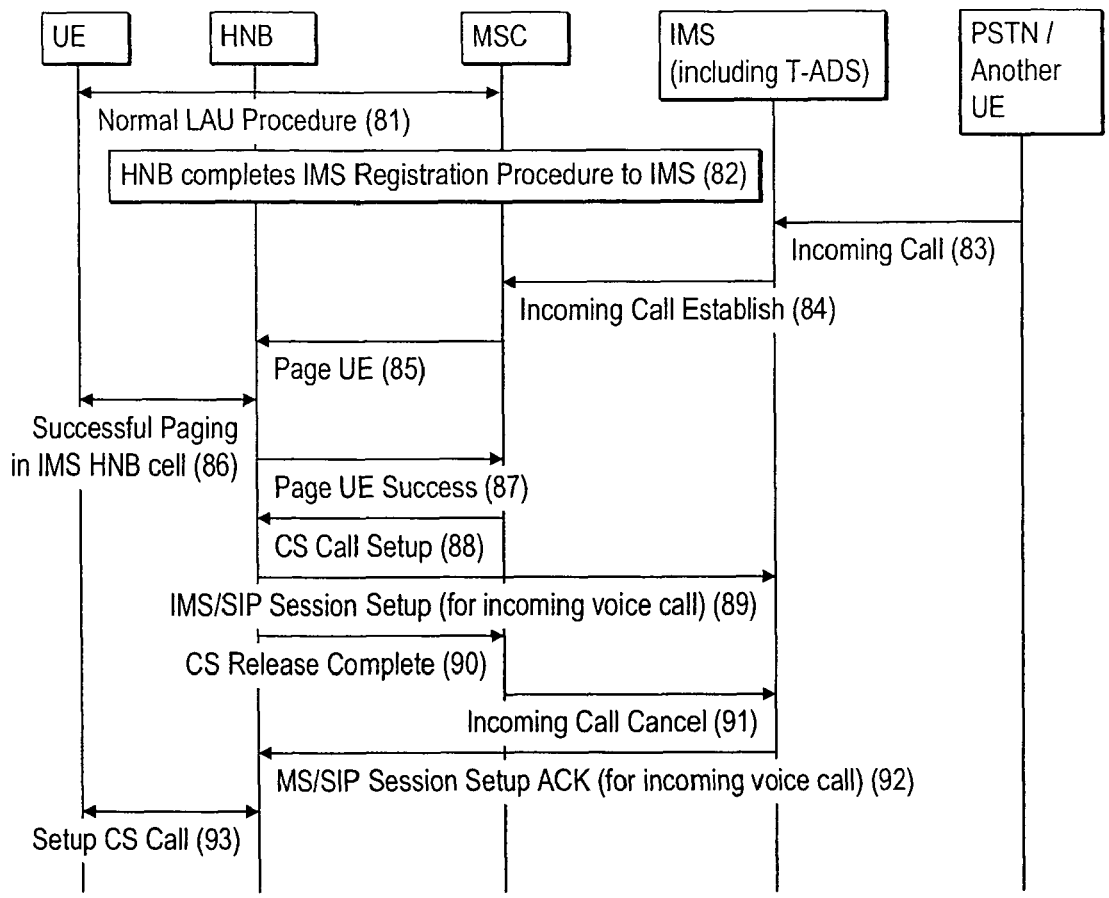
FIG. 8 illustrates an exemplary signalling diagram in relation to routing mobile terminating calls in accordance with a still further embodiment of this invention.

A still further alternative embodiment is illustrated in FIG. 8. This embodiment again assumes that the UE performs a normal LAU procedure with the serving MSC (81). The HNB also performs an IMS registration procedure with the IMS server (82). In this embodiment the T-ADS is configured to always route the call to the CS domain. Therefore, upon the IMS/T-ADS receiving an incoming call (83), the call is automatically routed to the MSC (84).

In accordance with the standard paging techniques, the MSC will page the UE in one or more cells. In this situation, the UE is registered as being located at the HNB, and so the MSC will only need to page the UE there (85). In response to this page from the MSC, the HNB will in turn send a page to the UE. If the UE responds to this page, then the HNB will send an acknowledgement to the UE that it has successful received its paging response (86). Additionally the HNB will positively respond to the MSC regarding the successful page (87). The MSC in turn sends a CS call setup message (88) in order to establish the call over CS.

However, in this instance an IMS connection is possible. Therefore according to this embodiment of the invention, when the MSC sends the CS setup message (i.e. according to 3GPP TS 24.008), instead of forwarding this message to the UE to establish the CS connection, the I-INB instead initiates a new "special" IMS/SIP session to the IMS, using the details from the CS setup message (89). This IMS session message has a special destination number that ensures the IMS routes the session to the correct T-ADS function (and that the T-ADS function can identify that this incoming session relates to the call it initiated to the MSC—as per the existing 3GPP standards).

In addition, in parallel, or after a short delay of a few milliseconds (in order to allow the IMS/SIP session set up to reach the T-ADS), it is preferable that the IMS HNB sends a CS Release Complete message (90) to the MSC in order to terminate the CS call with the MSC. This avoids the MSC's resources needlessly being consumed for long periods, and advantageously does not disturb network statistics (e.g. on paging success rates).

In response to this CS release complete message (90), the MSC, as per the standards, sends an incoming call cancellation message to the T-ADS (91). Provided the T-ADS has received the IMS/SIP session set up from the IMS server, the incoming call will not actually be cancelled by the T-ADS, but instead, routed to the "special" IMS/SIP session from the IMS HNB.

Once this call has arrived at the IMS HNB (92), the IMS HNB initiates a call using CS signalling the UE using the received data from the original CS call from the MSC (93). The call then goes ahead if/when the user answers.

This embodiment of the invention therefore enables an IMS HNB to fully utilise its IMS capabilities without requiring wholesale changes to the existing standards and network operation.

It is to be appreciated that the embodiments of the invention are to be considered as illustrative of the invention and not limitative, in that changes and additions are possible within the inventive concepts.

For instance, in the embodiments described above, the HNB is configured to appear to the UE as a conventional base station that communicates with the UE using GSM/UMTS/LTE protocols in accordance with the Standards (where they exist) and the licensed radio spectrum. Alternatively, the HNB could communicate with the UE by any other suitable technology—for example, by a Bluetooth® connection, WiFi or another unlicensed mobile access (UMA) protocol, which allows the GSM/UMTS/LTE features to be provided using a non-GSM/UMTS/LTE bearer technology.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. In a telecommunications network including a radio access network comprising a plurality of base stations, each defining a cell, for wirelessly transmitting data that is receivable by one or more mobile terminals, wherein at least one of the base stations, being a home base station, is an IMS-enabled Home Node B (HNB) in communication with a core component of the telecommunication network via an IP server, a method of validating a request to register a mobile terminal with the HNB, the method comprising:

obtaining an identifier of the last known cell in which the mobile terminal was registered, together with an age associated with that registration;

comparing the last known cell identifier and the associated age with the HNB identity; and using the comparison to decide whether or not to accept the request to register the mobile terminal, wherein the HNB transmits the request to register the mobile terminal to the IP server, wherein the IP server transmits a validation request to a verification server, wherein the verification server transmits a last known cell identifier request to obtain the last known cell identifier and performs the comparison upon receiving requested information, and wherein, after receiving the validation request, the verification server selects a communication connection to the mobile terminal and transmits a request to obtain a current serving cell identifier for the mobile terminal.

2. The method of claim 1, wherein the HNB transmits the request to register the mobile terminal to the IP server such that the request includes an identifier of the mobile terminal and an identifier of the home base station.

3. The method of claim 1, wherein the core network component is a home subscriber server/home location register (HSS/HLR) and upon receiving the last known cell identifier request, the HSS/HLR requests the information from:
   a) a relevant mobile switching centre (MSC) last associated with the mobile terminal; or
   b) a relevant packet switched (PS) domain node last associated with the mobile terminal.

4. The method of claim 1, wherein the verification server is a component of the IP server and includes an IMS server, and wherein the last known cell identity request transmitted by the IMS server is an Any Time Interrogate message according to customised applications for mobile network enhanced logic (CAMEL).

5. The method of claim 1, wherein, upon receiving the validation request, the verification server looks for an established packet switched (PS) tunnel as the communication connection with the mobile terminal, and where the PS tunnel is established, the verification server uses the PS tunnel to transmit the request to the mobile terminal for its current serving cell identifier, which will correspond to the last known cell identifier.

6. The method of claim 1, wherein, upon receiving the validation request, the verification server selects the communication connection as a connection through a mobile switching centre (MSC) to the mobile terminal and transmits the request using the connection through the MSC to the mobile terminal for its current serving cell identifier, which will correspond to the last known cell identifier.

7. The method of claim 1, wherein, upon receiving the validation request, the verification server intelligently selects the communication connection with the mobile terminal, out of either a PS tunnel established with the mobile terminal or at least one circuit switched (CS)access connection, and transmits the request to the mobile terminal for its current serving cell identifier, which will correspond to the last known cell identifier, such that the request is transmitted on the selected communication connection.

8. The method of claim 1, wherein the comparison is used to reject the registration request where the identity of the HNB does not match the last known cell identifier, or the age of the last known cell identifier is not within a predetermined time tolerance.

9. A home base station, an IP server or a verification server configured to perform the method according to claim 1.

10. The method of claim 1, wherein the verification server is a component of the IP server.

11. The method of claim 1, wherein the verification server is a separate server from the IP server.

* * * * *